Sept. 23, 1958   J. S. RALEIGH   2,853,266
DISCHARGE VALVE FOR VISCOUS MATERIALS
Filed June 30, 1954   2 Sheets-Sheet 1

Inventor
John S. Raleigh
by Roberts, Cushman & Grover
Att'ys.

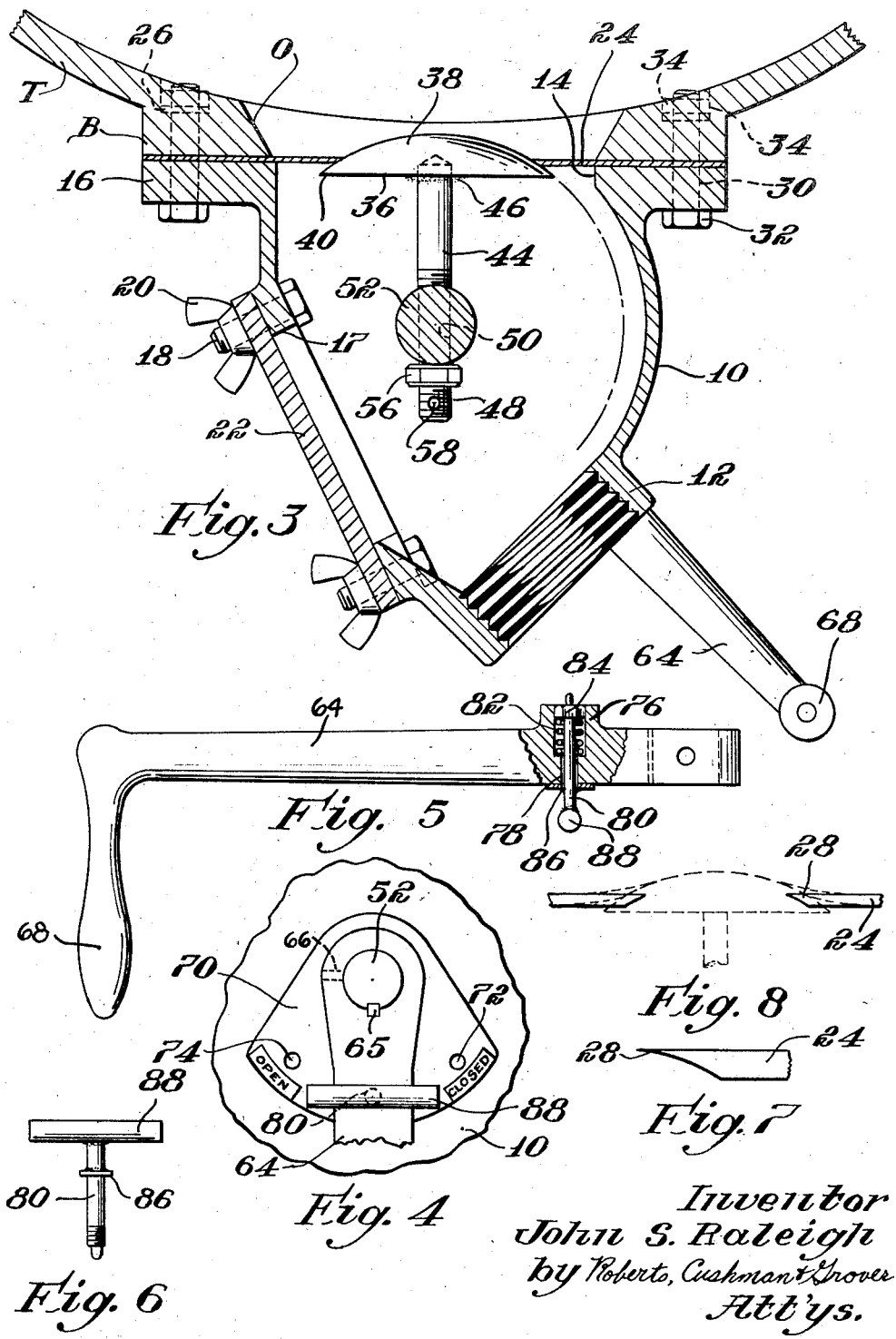

United States Patent Office 2,853,266
Patented Sept. 23, 1958

2,853,266

DISCHARGE VALVE FOR VISCOUS MATERIALS

John S. Raleigh, Taunton, Mass.

Application June 30, 1954, Serial No. 440,435

3 Claims. (Cl. 251—172)

This invention relates to valves and more especially to discharge valves for mixing vats and drums used in processing viscous materials.

Many industrial compositions such as rubber cements, pastes, paints and the like are compounded and processed in large vats and when finished drawn off through a valve at the bottom. Because of the high viscosity and slow flowing characteristics of these compositions the valves must be of large enough size to promote and facilitate drawing off. Large valves of conventional type such as gate valves and piston valves are, however, extremely difficult to operate and to maintain in operable condition because the stuffing boxes and glands used with such valves become clogged with the composition being processed so that they resist movement of the valve operating mechanism and because the viscosity of the material itself resist movement of the valve head or disk therethrough.

The principal objects of this invention are to provide a large capacity discharge valve in which the valve disk is easy to operate in spite of the viscosity of the material opposing its movement, to provide a valve disk which moves across the path of flow of the material passing through the valve rather than in opposition to the direction of flow, to provide a valve which does not require the use of stuffing boxes and/or glands which may become clogged with material being handled, to provide a valve in which the valve disk may be moved to cover and uncover its seat rapidly with very little operational manipulation, to provide a valve in which the valve disk and seat are so associated as to be self cleaning, that is so that any material which tends to stick or to obstruct proper engagement of the valve with the seat is pushed aside, to provide a valve in which the valve disk and seat are so constructed that the weight of the material in the vat to which the valve is attached improves the seal between the valve and its seat when closed and yet which does not increase the resistance of the valve to movement off its seat and to provide a valve in which the valve disk is adjustable to compensate for wear. Other objects are to provide a valve which is durable, easy to keep clean and in repair and has a minimum number of parts.

As herein illustrated the valve has a hollow bulbous body in which there are openings to admit material from a bottom opening in the tank to the hollow interior thereof and to discharge the material from the body. Surrounding the inlet opening is a valve seat and a valve disk is arranged within the body for movement relative to the seat so that when positioned against the seat the two are elastically engaged. The seat is constituted by sheet metal having a circular opening therein of appropriate size and is bolted to the body across the inlet opening. The valve disk has a curved surface and is mounted for movement from a position out of engagement with the rim of the opening in the seat to a position covering it, the mounting being such that the movement of the valve disk is along an arc corresponding to the radius of the center of curvature of the surface of the valve disk so that the curved surface of the valve disk moves in a direction which is substantially transverse to the direction of flow of the material through the valve, thereby slidably and progressively engaging and disengaging the seat. To this end a shaft is journaled in the body with its axis substantially parallel to the plane of the opening in the valve seat and through its geometrical center and the valve disk is fixed to one end of a stem, the other end of which is adjustably connected to the aforesaid shaft. A handle fast to the shaft externally of the case affords means to effect movement of the valve disk and a less than a quarter turn of the shaft, moves the valve to a covering or uncovering position. A latch is associated with the handle for engagement with a part of the case to hold the valve disk in an open or closed position. A radial flange extending about the inlet opening of the valve body provides for bolting it to the vat with the opening in registration with the opening in the bottom of the vat and the outlet opening may optionally be threaded to receive a pipe for conducting the material from the valve if desired.

The invention will now be described in greater detail with reference to the accompanying drawings wherein:

Fig. 3 is a vertical diametrical section taken on the line 3—3 of Fig. 1;

Fig. 4 is a fragmentary elevation to very much larger scale as seen from the right hand side of Fig. 1, showing the latch for the operating handle;

Fig. 5 is a plan view of the handle, sectioned in part to show the latch;

Fig. 6 is a plan view of the latch pin;

Fig. 7 is a fragmentary vertical section through a part of the valve seat plate at the opening therethrough; and Fig. 8 is a diametrical section through the valve seat plate showing in dotted lines in a very exaggerated manner the deflection or displacement of the valve seat plate when the valve disk is seated thereagainst.

Figures 1, 2:
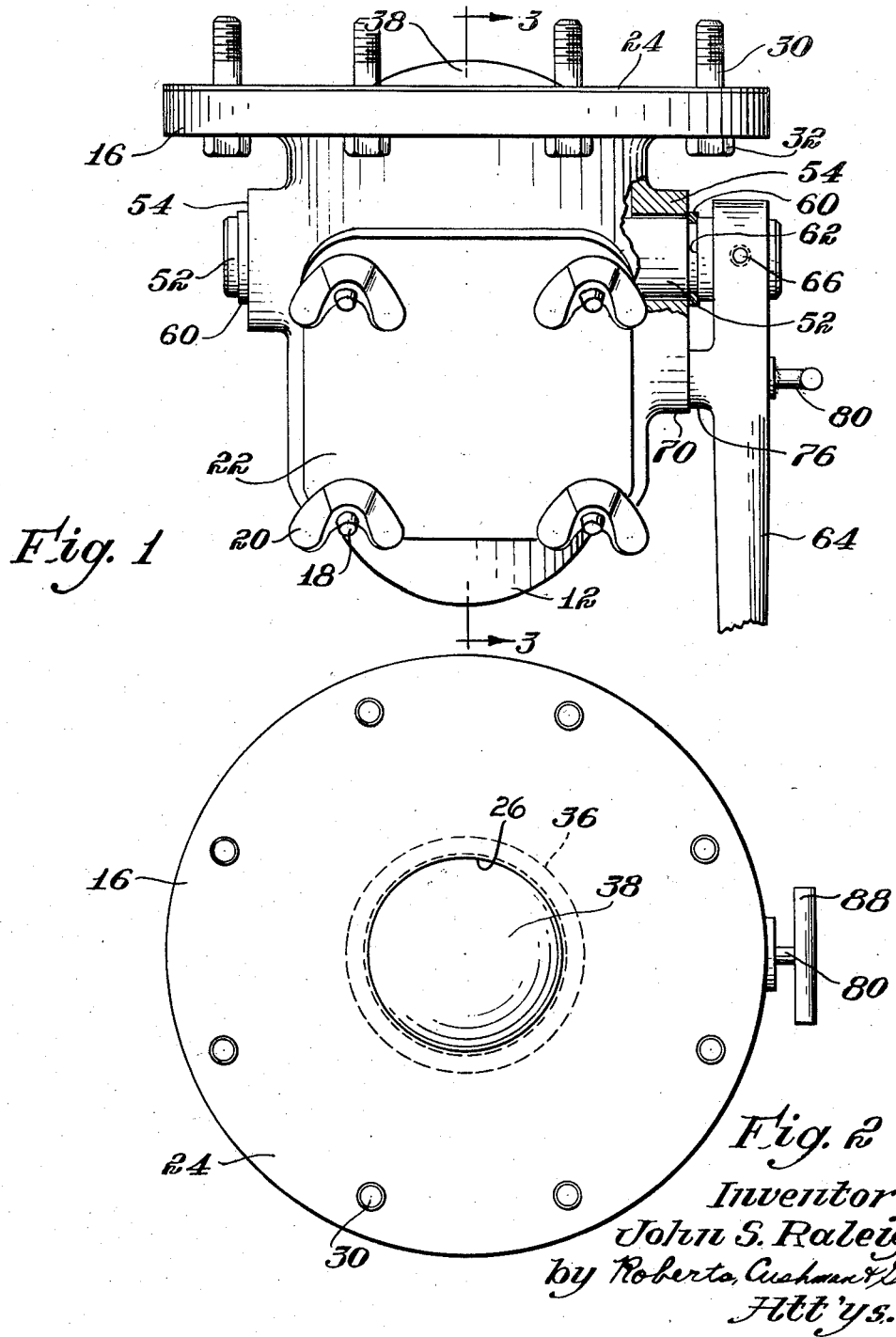
Fig. 1 is an elevation of the valve with a portion of the handle omitted.
Fig. 2 is a top view of the valve shown in Fig. 1.

Referring to the drawings (Fig. 3), the valve is shown attached to the bottom of a tank T or the like in registration with a large bottom opening O circumscribed by an annular boss B. The valve has a hollow bulbar body 10, at the lower part of which is a threaded pipe end 12 from which material passing through the valve is discharged. If desired, a delivery pipe may be screwed into the pipe end to conduct the material to another place. At its upper part the valve body has a large inlet opening 14 corresponding substantially in size to the bottom opening O in the tank and is bounded by an external, radially extending attaching flange 16, by which the valve body may be fastened by bolts with its inlet opening in registration with the opening O. A side opening 17 is also provided over which is secured by means of bolts 18 and wing nuts 20, a cover 22 so that access may be had to the interior of the valve body for the purpose of adjustment of the valve disk as will appear hereinafter and/or for cleaning the body and valve disk. The valve body as herein shown is an aluminum casting, however, it is to be understood that it may be made of other metals, may be fabricated rather than cast and may take any other shape in keeping with its intended place of installation so long as it does not interfere with its operation as will appear hereinafter.

The inlet opening 14 has a valve seat in the form of a flat sheet metal plate 24. The plate 24 has a circular opening 26 through it, the edge of which is beveled at 28 (Fig. 7). The valve seat plate is clamped between the flange 16 bordering the valve body and the boss B by bolts 30 and nuts 34 distributed at regularly spaced intervals peripherally of the flange. The plate is preferably made of spring tempered sheet steel of approximately 1/32–1/16 inch thickness and if the material to be handled is corrosive a corrosive resistant steel or alloy thereof or even brass or bronze may be used.

The valve disk 36 has a curved seat engaging surface 38 and is constituted by a segmental portion of a sphere which may be solid as herein illustrated, or hollow and has a perimeter or rim 40. Preferably, the angle between the chordal side of the disk and its curved side at the rim is kept as small as practical so that the rim forms a sharp blade-like edge which will slice through the material moving across the seat opening along an arcuate path substantially at right angles to the direction of flow of the material through the body with comparative ease. The chordal distance of the valve is greater than the diameter of the opening 26 in the valve seat plate, so that the rim of the valve disk projects beyond the rim of the opening. Hence when the valve disk is seated the edge of the seat rests on and is pressed against the valve disk thereby providing a tight seal. The valve disk swings in an arcuate path and in its open position is nested in the concave wall of the valve body substantially at right angles to the plane of the valve seat and laterally of the inlet and discharge opening. The valve disk is carried by a valve stem 44, one end of which is threaded into the disk 36 and made fast thereto by solder 46 placed about the base thereof. The other end of the stem 44 is threaded at 48 and screwed through a threaded opening 50, extending diametrically through a horizontally arranged shaft 52, the opposite ends of which are journaled in bosses 54—54 (Fig. 1) integral with the walls of the body. The bearing bosses 54—54 are so located that the axis of the shaft 52 is substantially parallel to the plane of the opening 26 in the plate 24 and at a distance from any point in the rim of the opening 26 substantially equal to the radius of curvature of the surface 38. The stem 44 is adjustable on the shaft so as to bring the curved surface of the disk into engagement with the beveled edge 28 of the opening 26 in such fashion that as it is moved from an inoperative position into engagement with the opening it will slide into engagement and simultaneously exert pressure on the plate perpendicular to the plane of the plate sufficiently to deflect the latter slightly and elastically (Fig. 8) thus to result in elastic engagement of the disk and its seat when they are engaged. As previously pointed out the edge of the seat is beveled at 28 with a radius of curvature corresponding substantially to that of the valve. To compensate for wear the valve stem 44 may be rotated in a direction to move the valve disk toward the seat and a nut 56 on the stem provides for locking the stem in a fixed position. A pair of diametrically intersecting openings 58 are made in the stem for receiving a rod or spanner wrench to assist in adjusting the stem to the proper position, access being had to the stem by removing the cover plate 22.

The shaft 52 is constrained against axial displacement by locking collars 60—60 seated in grooves adjacent the outer faces of the bosses 54—54. To effect rotation of the shaft 52, a handle 64 is fastened to an exteriorly projecting portion of the shaft by means of a key 65 and pin 66. The free end of the handle has a grip 68 extending right angularly thereto which may conveniently be grasped to rotate the shaft 52 from one position to another. In order to hold the disk in either an open or closed position a latch is mounted on the handle for engagement with holes carried by the case. To this end a flat surfaced boss 70 (Fig. 4) is formed on the wall of the casing in which are spaced holes 72 and 74. The handle 64 (Figs. 1 and 5) has on its inner side a boss 76 adapted to slide in contact with the boss 70 and has through it an opening 78 in which there is yieldably carried a latch pin 80. The latch pin 80 is acted upon by a spring 82 bearing against a nut 84 threaded on the inner end of the pin which tends to project its tip from the boss 76 into engagement with one or the other of the holes 72 and 74. Movement of the pin is limited by a collar 86 welded thereto at the outer side of the handle. A finger hold 88 provides for grasping the locking pin and pulling it outwardly against the opposition of the spring 82 so as to disengage it from one or the other of the holes 72 and 74. As the handle 64 is swung from one position to the other, the locking pin 80 will automatically engage the hole opposite which it is moved and lock the handle in that position.

The advantages gained by a valve constructed in accordance with the foregoing description are that the valve disk is seated by movement transversely to the direction of flow of the material through the valve so that it meets the least amount of resistance, that the valve disk is comparatively thin in the direction of flow and has a sharp edge which easily slices through the material as it moves transversely thereof, and that the engagement of the valve disk with its seat is progressive so that it slidingly engages the seat and tends to deflect any foreign matter or large hard pieces of material which tend to obstruct or block closing. Other advantages reside in the elastic engagement of the valve disk with its seat which helps to maintain a good seal even after wear and the progressive movement of the valve disk across the seat opening which tends to wipe and clean the perimeter thereof at each opening and closing. A further advantage of the construction is that the flow of the material bears against the valve seat and tends to press the valve seat against the valve. A further advantage attained is by reason of the elasticity of the valve seat in that a close fit may be maintained without constant adjustment. Other advantages are that the valve disk requires no stuffing boxes or glands and hence is not susceptible to clogging and that when the valve disk is swung to its full open position it nests in the concave side wall of the valve body in an out of the way position so that it does not interfere with the flow of material from the inlet opening through the body of the valve to and through the outlet opening 12. Additional advantages are that the valve may be provided with a comparatively large discharge opening to induce rapid flow without increasing the difficulty of opening and closing and that both opening and closing may be accomplished rapidly with a minimum amount of manipulation. Another important advantage resides in the fact that by mounting the valve disk so that its radius of curvature has its center at the axis of the rotation of the shaft which carries it, the valve disk can be moved into and out of operative position by less than a quarter turn of the handle thus making it possible to open and close the valve quickly and with a minimum amount of manipulation.

It should be understood that the present disclosure is for the purpose of illustration only and that this invention includes all modifications and equivalents which fall within the scope of the appended claims.

I claim:

1. In a valve, a hollow valve body having inlet and discharge openings, a sheet metal diaphragm having an opening in it, the rim of which constitutes a seat bordering the inlet opening and a disk operable to cover the seat in one position and to be retracted to uncover the seat in another position, said disk having a surface which is spherical in part, means supporting the disk for swinging movement of its spherical part relative to the seat opening about a center which is substantially equal to the radius of curvature of the disk and equidistant from at least three points on the rim of the seat opening, said valve disk being threadably mounted on its support for adjustment to increase its radius of swinging movement.

2. In a valve, a hollow valve body having a discharge opening, a sheet metal diaphragm having an opening in it, the rim of which constitutes an elastic metal seat bordering the opening, a disk operable to cover the seat in one position and to be retracted to uncover the seat in another position, said disk being a rigid spherical segment having a chordal distance greater than the diameter of the opening, a stem fast to the segment perpendicular to the chordal plane, a shaft swingably supporting the stem for movement about an axis located at a distance from the opening which is substantially equal to the radius of the curvature of the segment and is equidistant from three points on the rim of the opening, said shaft having a diametrically threaded hole and said stem having a threaded end in threaded engagement with the threaded hole in the shaft.

3. In a valve, a hollow valve body, said valve body having inlet and discharge openings, an elastic diaphragm situated between the inlet and discharge openings, said diaphragm containing a circular opening, the rim of which constitutes an elastic valve seat, a valve element having a spherical surface for engagement with the valve seat, and means mounting the valve for movement in an arc about a center located on a perpendicular to the plane of the valve seat, said mounting means being adjustable to move the center about which the valve swings relative to the rim of the seat so that the valve yieldably presses the seat upstream, said valve being movable from a position in contact with the valve seat, in which position it closes the valve seat opening, to a position substantially at right angles thereto, and situated laterally of the inlet and discharge openings in the valve body.

References Cited in the file of this patent

UNITED STATES PATENTS

| | | |
|---|---|---|
| 574,838 | Walsh | Jan. 5, 1897 |
| 851,338 | Barnhouse | Apr. 23, 1907 |
| 1,688,035 | Bryant | Oct. 16, 1928 |
| 2,000,853 | Lange | May 7, 1935 |
| 2,191,232 | Heinen | Feb. 20, 1940 |
| 2,514,551 | Monroe | July 11, 1950 |
| 2,745,360 | Lunde | May 15, 1956 |

FOREIGN PATENTS

| | | |
|---|---|---|
| 198,785 | Switzerland | of 1938 |
| 259,641 | Switzerland | of 1949 |
| 651,440 | Great Britain | of 1951 |